May 22, 1951 L. BEHR 2,553,629
EXHIBITING INSTRUMENT
Filed Jan. 25, 1946 3 Sheets-Sheet 2
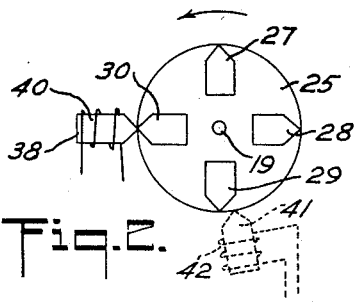
Fig. 2.
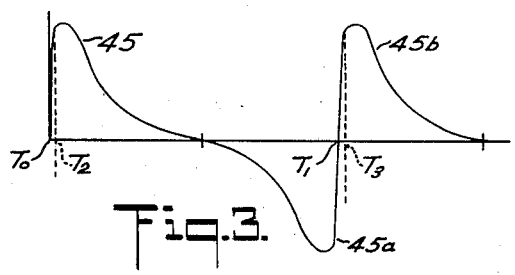
Fig. 3.
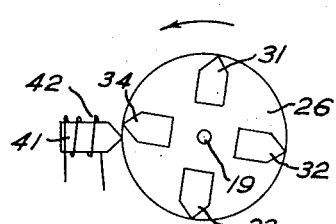
Fig. 5.
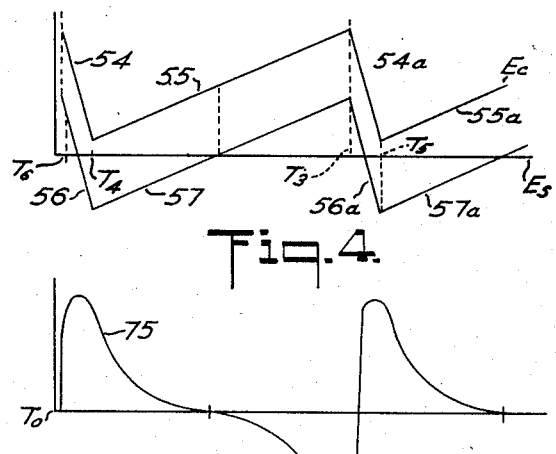
Fig. 4.
Fig. 6.
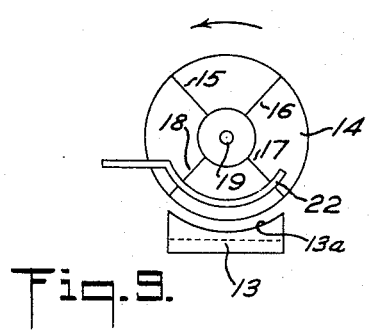
Fig. 9.
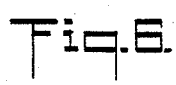
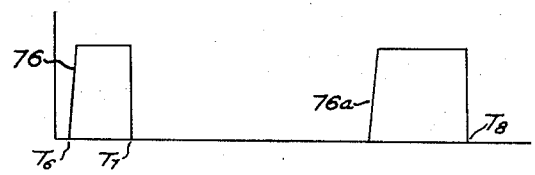
Fig. 7.
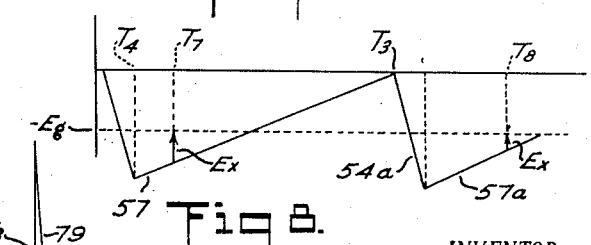
Fig. 8.
Fig. 10.
INVENTOR.
LEO BEHR, DECEASED,
BY ELIZABETH K. BEHR
ADMINISTRATRIX
Virgil E. Woodcock
ATTORNEY May 22, 1951 L. BEHR 2,553,629
EXHIBITING INSTRUMENT
Filed Jan. 25, 1946 3 Sheets-Sheet 3
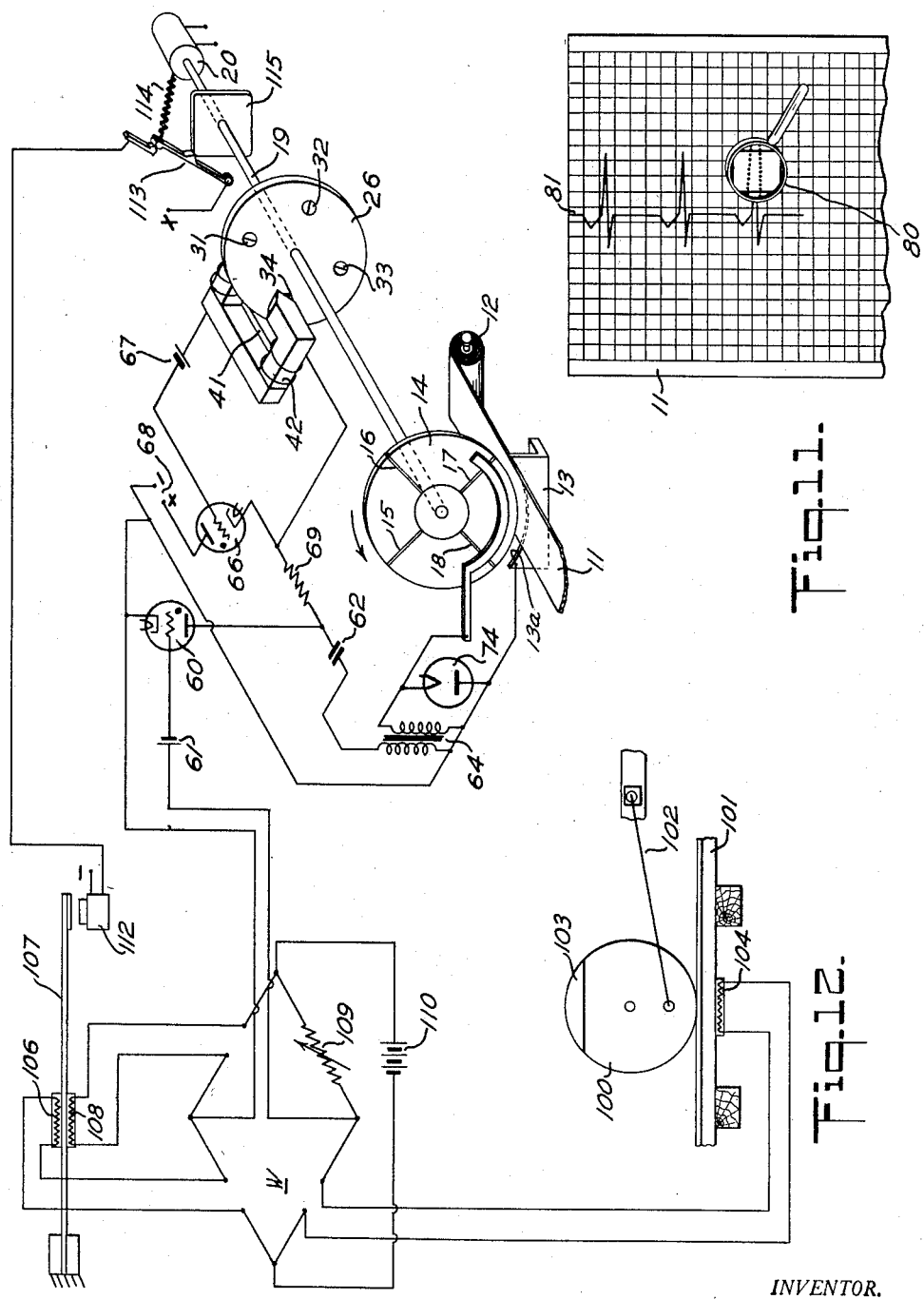
INVENTOR.
LEO BEHR, DECEASED
BY ELIZABETH K. BEHR,
ADMINISTRATRIX.
Virgil E. Woodcock
ATTORNEY Patented May 22, 1951

2,553,629

UNITED STATES PATENT OFFICE 2,553,629

EXHIBITING INSTRUMENT

Leo Behr, deceased, late of Philadelphia, Pa., by Elizabeth K. Behr, administratrix, Philadelphia, Pa., assignor to Leeds and Northrup Company Application January 25, 1946, Serial No. 643,407

10 Claims. (Cl. 346—33)

1

This invention relates to an exhibiting means of the type in which there may be rapidly produced a visual indication of the magnitude of a condition and has for an object the provision of a simple and reliable exhibiting means in which there is immediately available a visual record of a rapidly varying condition.

Heretofore, for a rapidly varying condition, it has been usually necessary to utilize oscillographic elements and photographic recording paper in order to produce a record of such changes. With photographic paper it is, of course, necessary to develop the paper after exposure and in so doing to exercise great care in preventing stray light from further exposing the paper. Where this is done automatically the mechanism is very complex and provision must be made for the supply of reagents. Such systems leave much to be desired.

It has heretofore been proposed to utilize electrical systems in which a capacitor is discharged to produce a spark in order to mark the recorder paper. Such systems, however, have required variable resistors with associated sliding contact members and they have utilized contact-making galvanometers in order to control the charging and discharging of a capacitor. Thus, such systems have mechanical limitations as to speed of operation, and the sliding contacts and variable contact resistances in the contact-making galvanometers introduce electrical limitations which leave much to be desired in such systems.

Accordingly, it is a further object of the invention to provide an exhibiting means operable at high speed to record magnitudes of rapidly varying conditions by a system which does not include relatively movable electrical circuit elements such as variable resistors and in which contact resistance has been avoided insofar as operation of the system is concerned.

In carrying out the invention in one form thereof, the exhibiting means comprises a suitable chart across which an element or marking means moves along a fixed path. By means of an electric valve and associated control apparatus, a spark is produced to mark the paper and thereby record instantaneous magnitudes of the condition under measurement. The foregoing is in part accomplished by production of a voltage synchronized with the movement of the aforesaid element. The voltage varies through a predetermined range coincident with movement of the marking means. A second voltage related to the magnitude of a condition is produced and its magnitude varies as a function thereof. The algebraic sum of these voltages is applied to render the valve conductive whenever the marking means occupies a position on the chart indicative of the then existing magnitude of the condition under measurement. The frequency of recording is so high that the resultant record is substantially continuous. The operation is characterized by the fact all circuit elements are fixed with respect to each other. The voltages are produced by internal changes which do not require relative movement of one circuit element with respect to another.

For a more complete understanding of the invention and for further objects and advantages thereof, reference should be had to the following description taken in conjunction with the accompanying drawings, in which:

Fig. 1 schematically illustrates the invention, partly in perspective, and also comprises a wiring diagram;

Figs. 1-A, 1-B and 1-C are respectively plan, elevation and end views of one of the magnetic inserts;

Fig. 2 diagrammatically illustrates one of the control elements of Fig. 1;

Fig. 3 is a graph of the voltage produced in the coil of Fig. 2;

Fig. 4 is a graph of voltage variations in a part of the circuit of Fig. 1;

Figure 1:
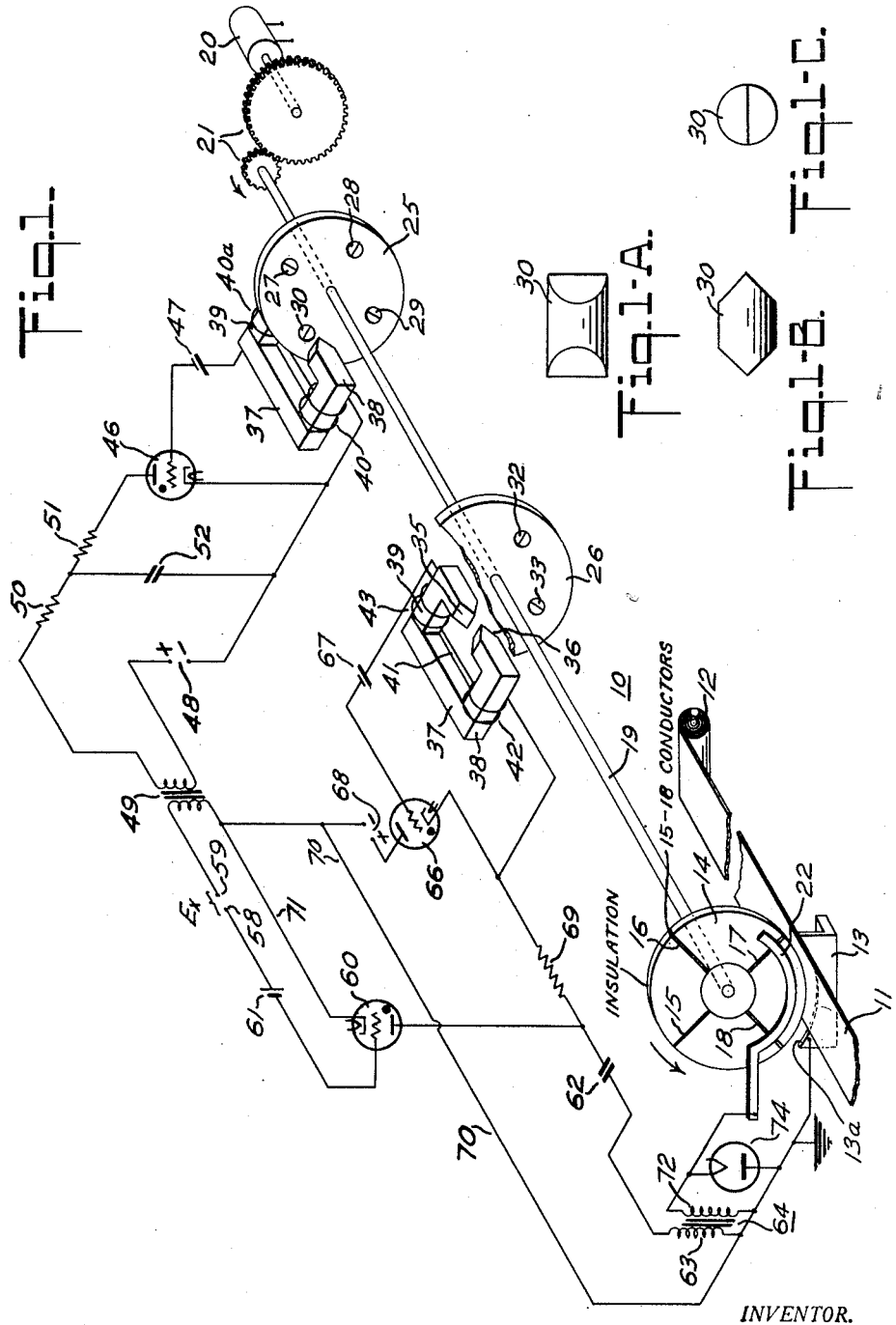

Fig. 5 schematically illustrates another of the control elements of Fig. 1;

Fig. 6 is a graph of the voltage produced by the device of Fig. 5;

Fig. 7 is a graph illustrating cyclic charging of a capacitor of Fig. 1;

Fig. 8 is a graph illustrating the resultant voltage applied to one of the electric valves of Fig. 1;

Fig. 9 diagrammatically illustrates the recording elements of Fig. 1, with the record sheet omitted;

Fig. 10 is a graph illustrating the voltage impulses which produce marking of the record sheet;

Fig. 11 is a fractional view of a selected part of a record sheet with a typical record shown thereon; and Fig. 12 schematically illustrates a particular application of the invention.

Referring to the drawings, the invention in one form has been illustrated as applied to an exhibiting instrument 10 provided with a record sheet 11, fed from a supply roll 12 by suitable means, not shown. The record sheet extends over a plate-like conducting member 13, provided with a mid-portion 13a of arcuate form.

Disposed above the record sheet is a marking means 14, illustrated in the form of a disc. It carries a plurality of marking elements 15—18. The marking means 14 is secured to a shaft 19, driven by a motor 20, through gearing 21. The marking elements 15—18 in succession move in close proximity past an arcuate conductor 22. When one of the marking elements occupies a position with reference to the record sheet 11 which is indicative of the then existing magnitude of a condition under measurement, a high voltage is applied between conductors 13 and 22 and a spark is produced between one of elements 15—18 and the member 13 to mark the sheet. There may be a sliding contact between the elements 15—18 and the conductor 22 or there may be a slight space therebetween. In either case the voltage is sufficiently high to insure the production of a spark or current flow between one of the elements 15—18 and the conductor 13. Preferably, the recording sheet may comprise current-sensitive paper of the type known to the art under the trade-name of "Teledeltos." In accordance with the invention, the record sheet shall have the characteristic of yielding a distinctive mark when current passes through it.

In order to synchronize the production of a distinctive record on the record sheet with the instantaneous magnitude of the condition, synchronizing devices 25 and 26 are utilized. As shown, these devices consist of discs 25 and 26 of non-magnetic material, each having four inserts of magnetic material. The disc 25 is provided with inserts 27—30 and the disc 26 is provided with inserts 31—34, Figs. 1 and 5. Preferably each magnetic insert is provided with chisel-shaped ends. The plan, elevation, and end views, Figs. 1-A, 1-B and 1-C, of the element 30, taken as exemplary, show a suitable shape therefor. As best shown in Fig. 1, the inserts 27—30 pass in succession between the poles 38 and 39 of a permanently magnetized structure, which includes a permanently magnetized bar 37, with polar extensions 38 and 39, respectively encircled by windings 40 and 40a. A like magnetic structure 41 is associated with the disc 26 with the respective windings 42 and 43 shown encircling the respective polar projections of the structure. It will be observed the pole pieces of both magnetic structures are also chisel-shaped so that as each magnetic element passes between them there will be a maximum change of magnetic flux passing through the windings associated therewith.

In order clearly to show the angular disposition and phase relation between the elements 27—30 and 31—34, they have been diagrammatically shown in Figs. 2 and 5, together with the windings 40 and 42 and their associated magnetic structures 38 and 41. It will now be assumed that the motor 20 rotates the shaft 19 in a counter-clockwise direction, as indicated by the arrows, and at constant average speed. As the polar element 30, Figs. 1 and 2, passes from its illustrated position, Fig. 2, with respect to the structure 38, there will be induced in the winding 40, at the time $T_0$ a voltage which rises very abruptly, as shown by the graph of the first impulse 45, Fig. 3. This voltage, as the element 30 moves away from the structure 38, decreases. As the decreasing magnetic flux approaches its original value a negative voltage pulse 45a is induced in the coil 40. At the time $T_1$, the next element 27 will have arrived opposite the chisel-shaped structure 38 to produce thereafter a second voltage impulse 45b of shape identical with the one just described. The first positive impulse 45 is applied to the grid or input circuit of an electric valve 46, preferably a grid-controlled gaseous valve of the type known as a thyratron. This circuit includes a grid-biasing battery 47. The output circuit of the valve 46 includes a source of anode supply 48, an output transformer 49, resistors 50 and 51, and a capacitor 52 connected from the junction of resistors 50 and 51 to the cathode of the valve 46. The time constant of the circuit including the resistor 51 and the capacitor 52 and the resistance of the valve 46 is relatively short with respect to the time constant of the circuit including the capacitor 52, the primary winding of the transformer 49, and the resistor 50.

The effect of the firing of the tube 46 at the times $T_2$ and $T_3$ is to complete a low resistance circuit across the capacitor 52. The resistor 51 is included in this discharge circuit to limit the initial current flow. The capacitor 52 discharges, and the voltage across it decreases as indicated by the graph 54 of Fig. 4, where voltage has been plotted as ordinates against time as abscissae. When the discharge current of capacitor 52 has decreased to a relatively low value, the tube 46 becomes non-conductive. When this occurs (at time $T_4$) the voltage across the capacitor 52 begins to rise and it continues to rise, almost linearly, as indicated by the graph 55. At the time $T_3$, the next element 27 produces an impulse which again causes the valve 46 to fire, again to complete a discharge circuit for the capacitor 52. The voltage decreases as shown at 54a, and at the time $T_5$ it again rises.

During the charging of capacitor 52, the current flowing through the primary winding of the transformer 49 induces a voltage in the secondary winding thereof which is of generally the same shape as that across the capacitor 52. Although the slopes will in general be different, they have been shown to be the same by graphs 54—55, 54a—55a and graphs 56—57 and 56a—57a of Fig. 4.

It will be observed there is connected in circuit with the secondary winding of the transformer 49, terminals 58 and 59 for application thereto of an unknown voltage designated as $E_x$. This voltage may aid or oppose that from the secondary winding of the transformer 49. The resultant or algebraic sum of the two voltages is applied to the grid or input circuit of a second thyratron or gaseous electric valve 60. This input circuit also includes a negative grid-biasing means 61. The electric valve 60 controls the discharge of a capacitor 62 which, it will be observed, is connected in series with the primary winding 63 of a transformer 64, the secondary winding of which is connected to the arcuate contact member 22 and to the associated arcuate contact or plate 13. The plate 13 is preferably connected to ground.

The capacitor 62 is charged by means of a circuit controlled by a third thyratron or gaseous electric valve 66 whose grid circuit includes a negative biasing means 67, and the coils 42 and 43 of the magnetic structure 41. When a voltage impulse is produced by passage of one of the elements 31—34 through structure 41, the valve 66 fires to complete a charging circuit for the capacitor 62, which circuit may be traced from the positive side of a source of supply 68, through the valve 66, resistor 69, capacitor 62, primary winding 63, and by conductor 70 to the negative side of the source of supply. As soon as the capacitor 62 approaches full charge, the current through the valve 66 is sufficiently reduced to render it non-conductive.

It will now be assumed that the capacitor 62 has been charged and that the resultant or algebraic sum of the voltage $E_x$, the voltage of the biasing means 61, and that across the secondary winding of transformer 49 causes the tube 60 to fire. The capacitor 62 thereupon discharges through a very low-resistance path which may be traced from one side of capacitor 62, through the valve 60, conductors 71 and 70, and by the primary winding 63 to the other side of the capacitor 62. The rush of current flowing through the primary winding 63 produces a relatively high voltage across the secondary winding 72 thereof. This voltage produces a spark between the arcuate contact member 22 and one of the contact members 15—18 of the disc 14, and it also produces a second spark or conductive path through the record sheet 11 to the cooperating contact plate or member 13. The flow of current through the recording paper produces a distinctive mark. In order to eliminate oscillatory current in the secondary winding 72 and in order to obtain a single discharge or unidirectional flow of discharge current, a diode 74 is connected across the secondary winding 72. The diode is poled or is connected with a polarity such that it forms a low-resistance path for current flow of a polarity opposite to that of the current which produced the mark or marks on the record sheet 11. The diode 74 furthermore reduces the impedance of the transformer 64 during charging of the capacitor 62 and thereby maintains low the voltage of the secondary winding during the flow of such charging current. The charging current flows through primary winding 63 in a direction opposite to the flow of the discharge current therethrough.

It will be observed that the graphs of Figs. 3, 4, 6, 7, 8 and 10 have been plotted with time as abscissae, and to the same time scale. Accordingly, the synchronized operation of the several component parts of the system may be readily understood by reference to the explanatory graphs. Figs. 3 and 4 have already been explained. The curve 75 of Fig. 6, represents the voltage applied to the grid-control circuit of the valve 66. It will be observed that the impulses occur at slightly later times than the impulses applied to the valve 46. This difference in timing is also indicated in Fig. 5 where the element 34 is approaching the magnetic structure 41, while in Fig. 2 the element 30 is shown directly opposite the magnetic structure 38. During the time the voltage across the secondary winding of the transformer 49 is decreasing, as shown by the graphs 56, 56a, Fig. 4, the valve 66 is rendered conductive, as at the time $T_5$ for the flow of charging current to the capacitor 62. The resistor 69 included in this circuit has a relatively low value so that the capacitor 62 is quickly charged to a maximum value. As shown in Fig. 7, the charging of the capacitor is indicated by the lines 76, 76a. It is charged in a very short time interval and retains its charge until time $T_7$ at which the tube 60 fires. Referring to Fig. 8, the valve 60 will fire whenever the resultant voltage applied to its grid circuit is equal to the value $-E_g$, which is its threshold or critical grid voltage. Accordingly, when the unknown voltage $E_x$ is equal to, but of opposite sign from the rising voltage 57 across the secondary winding of the transformer 49, the tube 60 fires to produce an impulse 77, as shown in Fig. 10.

The foregoing operations then repeat themselves. When the voltage again rises on the secondary winding of the transformer 49 as indicated at 57a, Fig. 8, and when the unknown voltage $E_x$ again causes the tube 60 to fire, a second impulse 79 will be produced at the time $T_8$ to cause a second mark on the record sheet 11.

The foregoing cycles of operations are rapidly repeated. More specifically, with the four elements shown in the drawings and with a speed of the shaft 19 of 7200 revolutions per minute, 480 marks will be produced on the record sheet each second. Accordingly, the system lends itself to the recording of rapidly varying conditions, such for example, as in electrocardiography. The position of each mark on the record sheet 11 will be representative of an instantaneous magnitude of the condition under measurement as represented by the magnitude of the unknown voltage $E_x$. This position laterally of the chart is fixed and determined by the time required for each of contact elements 15—18 to traverse the chart and by the provision of the rising voltage pulses 57, 57a across the secondary winding of the transformer 49 during time intervals synchronized with those required for the traverse of the chart by each of the elements 15—18. More specifically, at the time $T_4$, Fig. 8, one of elements 15—18 will have arrived at the edge of the chart while that same element will be leaving the opposite edge of the chart at the time $T_3$. While the edge of the chart has been referred to, it will, of course, be understood that any selected area between predetermined lateral limits thereof may be utilized for recording purposes.

In Fig. 11 there has been illustrated an electrocardiographic record which is exemplary of the kind made in accordance with the present invention. A magnifying glass 80 is illustrated to reveal that what appears to be a continuous graph actually comprises a plurality of small dots or markings made by discharges. These dots are produced by discharges corresponding with those of 77 and 79 of Fig. 10. It will be observed that the curve 81 of Fig. 11 appears as a narrow line, sharp and distinct, in contrast with the characteristic broad traces of the prior art electrocardiographic records. Accordingly, the curve of Fig. 11 may be more readily analyzed.

Now that the invention has been fully explained, it will be understood that the discs 25, 26 and 14 may be consolidated into a single disc with one set of magnetic elements 27—30, and with magnetic structures 38 and 41 suitably disposed with respect thereto to perform the same functions as the separate discs set forth in the foregoing description. For example, in Fig. 2 the magnetic structure 41 has been shown in broken lines in the angular position which it would occupy when combined with the disc 25.

In the foregoing embodiment of the invention, a mark was produced on the record sheet on attainment of a resultant voltage of predetermined magnitude. The system may of course function in response to variable currents which by use of impedances may be converted into voltages. The system is not limited to a determination of the magnitude of voltages or currents, but it is also applicable to the measurement of varying impedances which may be utilized to produce variable voltages. As exemplary of such a modification, the invention is shown in Fig. 12 as applied to the measurement of impact forces developed by a driving wheel 100 of a locomotive on a rail 101. The wheel 100 is driven through a connecting rod 102. Such a drive produces impact forces upon the rail 101 by virtue of the counterweight 103 and the unbalanced forces of the driving mechanism including the connecting rod 102. These forces and the strains produced thereby are of importance. They may be readily measured by attaching to the rail 101 a strain-responsive element or gage 104 which may consist of a resistance wire of relatively small diameter which is cemented to a surface of the rail. The strain-responsive element 104 has the characteristic of changing its electrical resistance in response to strain. Therefore any strain of the metal of the rail will produce a change in the electrical resistance of the gage 104. The gage itself is connected in one arm of a Wheatstone bridge W. The Wheatstone bridge is also utilized to provide a control voltage for the electric valve 60, which with other parts numbered as in Fig. 1, perform like functions to those of Fig. 1. There is connected in at least one other arm of the bridge W a strain gage 106 which is cemented to a vibrating reed 107 in the region where maximum strain occurs. As shown, a third strain gage 108 is cemented to the opposite side of the reed 107, and is connected into the third arm of the bridge W. The fourth arm thereof comprises a variable resistor 109. Power is supplied to the bridge from any suitable source, such as a battery 110, while the output from the bridge is applied to the input circuit of the valve 60. With the parts at rest, the resistor 109 is adjusted to balance the bridge W.

The reed 107 is driven by an electromagnet 112 energized through a circuit which includes a contact-making and breaking device 113. The device 113 is driven between open and closed positions by means of a spring 114 and a cam 115 carried by the shaft 19. The cam 115 is provided with four crests to close the circuit to the electromagnet 112 four times during each revolution of the shaft 19. As in the previous modification, four magnetic inserts 31—34 are carried by the disc 26. As before, the charging and discharging of the capacitor 62 is under the control of the valves 60 and 66, and the magnetic structure 41. The reed 107 is synchronously operated with respect thereto by proper phasing of the cam 115 with respect to the disc 26. In this form of the invention, the reed 107 varies the resistances of the gauges 106 and 108 in opposite directions to balance the bridge W at some point in each cycle. In the absence of strain on the gauge 104, the bridge W will be balanced when the reed 107 is in its neutral position and as one of the marking elements 15—18 arrives at the center of the record sheet 11.

It will now be assumed that the unbalanced weight on the wheel 100 produces an increase in the resistance of the gauge 104. This change causes the balance of the bridge W to occur when the free end of the reed 107 in a position lower than that illustrated or in a position where there has been an increase in the resistance of the gauge 106 and a decrease in the resistance of the gauge 108. More particularly, and in accordance with well understood principles of operation of a Wheatstone bridge, the increase in resistance of the gauge 104 unbalances bridge W. However, as the reed 107 moves downwardly the increase in resistance of gauge 106 and the concurrent decrease in resistance of gauge 108 effects rebalance of the bridge. The rebalance of the bridge will occur when the reed 107 moves to a position where the resultant change in the resistances of gauges 106 and 108 compensates in the bridge for the change in resistance of the gauge 104. Since the reed 107 moves synchronously with the disc 14, the instant of balance occurs with one of the marking elements 15—18 in a definite relationship with respect to the chart 11. In terms of operation, the valve 60 will be fired at later point in the cycle to produce a mark on the record sheet 11 to the right of center, as viewed in Fig. 12. Conversely, if the resistance of the gauge 104 is decreased, the tube 60 will fire earlier and a mark will be produced to the left of the center of the record sheet 11, as viewed in Fig. 12. In both instances, the distance of the mark from the center of the chart will be a measure of the strain produced in the rail 101 and in the gauge 104.

In no form of the invention are there any sliding contacts to give rise to unwanted variations in resistance, faulty operation, excessive wear, and short life. On the contrary, in the measuring circuits, the network, all parts are fixed with respect to each other and the necessary electrical variations are produced by internal changes which do not require relative movement of contacts and the like. Accordingly there are no limitations as to speed of operation and, as above shown, a speed as high as 480 marks per second may be readily utilized. A higher or lower number of marks per second may be made, depending upon the particular application of the invention.

While preferred embodiments of the invention have been described, it will be understood that further modifications may be made within the spirit and scope of the invention as set forth in the appended claims.

What is claimed is:

1. In a high speed exhibiting means, the combination of a stationary magnetic structure including a coil, elements movable with respect to said structure for producing in said coil a series of voltage impulses of alternate polarities in timed relation one to the other, marking means, means for moving said marking means across a record sheet in timed relation with the production of said voltage impulses, a pulse-generating circuit including a source of supply operable under control of said impulses of one polarity for producing a series of voltage pulses the magnitude of each of which varies substantially linearly with respect to time, electric valve means having a control circuit in which an unknown voltage is algebraically added to said linear pulses, the resultant of said voltages rendering said valve means conductive whenever the resultant of said voltages attains a predetermined value, a capacitor, a discharge circuit therefor including said valve means, a second valve means, a charging circuit for said capacitor including said second valve means, means operable upon discharge of said capacitor for producing a mark upon said record sheet by said marking means, and means for rendering said second valve means conductive while said first-named valve means is non-conductive.

2. In a high speed exhibiting means in which driving means is provided repeatedly to move marking means across a record sheet, the combination of an electrical network including a stationary coil carried by a magnetic structure including a permanent magnet therein, means separate from said network for producing in synchronism with movements of said marking means a repetitive undulating voltage comprising a plurality of magnetic members for movement with respect to said structure to produce in said coil said undulating voltage, said network also including means for producing in said network voltages representative of corresponding magnitudes of a condition, electric valve means responsive to the resultant of said voltages developed in said network and rendered conductive whenever said resultant voltage attains a predetermined magnitude, a normally charged capacitor connected in circuit with said valve means, a transformer in said network having its primary winding in circuit with said capacitor for producing a high voltage across the secondary winding thereof upon discharge of said capacitor, electrodes respectively connected to said secondary winding to energize said marking means to produce a mark upon said record sheet at the instant said valve means is rendered conductive, and means including a source of supply and a second valve means in said network for charging said capacitor while said first-named valve means is non-conductive.

3. In a high speed exhibiting means in which marking means repeatedly move across a record sheet, the combination of means for driving said marking means, an induction generator driven by said driving means and comprising a stationary magnetic structure and a rotatable disc having magnetic inserts carried thereby, a coil carried by said stationary structure for producing voltage impulses during movement of each magnetic insert with respect to said structure, a first valve means having an input circuit for rendering said valve means conductive in response to said voltage impulses, said valve means having an anode-cathode circuit including a capacitor and a resistor, a voltage impulse producing circuit including said capacitor, a source of power, a transformer, and a second resistor having a resistance materially greater than said first-named resistor for producing substantially linear voltage impulses in timed relation with the time intervals during which said valve means is rendered conductive, a second valve means having an input circuit connected to the secondary winding of said transformer, said second valve means having an output circuit including a second normally charged capacitor and the primary winding of a second transformer, means responsive to the resultant of an unknown voltage and a linear impulse applied by said first-named transformer for rendering said second valve means conductive for discharge of said normally charged capacitor, and means for producing flow of current from said marking means to said record sheet upon discharge of said normally charged capacitor.

4. In a high speed exhibiting means in which the magnitude of a condition is to be recorded on a record sheet, the combination of an arcuate electrode across which said record sheet moves, at least one marking element movable at uniform speed across said record sheet, driving means for said marking element, means for producing flow of current between said marking element and said electrode and at a point on said record sheet representative of the magnitude of a condition comprising a plurality of electric valves, means for producing control voltages in timed relation with the movement of said marking means, said last-named means comprising an induction generator driven by said driving means, means including one of said valves operable under the control of said induction generator for producing a saw-tooth control voltage, a circuit for combining said saw-tooth voltage with an unknown voltage, a second electric valve rendered conductive upon the attainment of a predetermined resultant voltage in said combining circuit, and a capacitor for producing said current flow whenever said second valve is rendered conductive.

5. In a high speed exhibiting apparatus for recording rapidly varying electrical potentials on a longitudinally moving record sheet, marking means, means for cyclically moving said marking means transversely across said record sheet, an electrical network including a coil, means including at least one magnetic element movable in timed relation with movement of said marking means for rapidly varying a magnetic field cutting said coil to generate voltage impulses in said network each of which varies substantially linearly with time, electric valve means having in said network an input-control circuit in which an unknown potential is algebraically added to said linear impulses, the resultant of said potential and a voltage impulse in said control circuit rendering said valve means conductive whenever said resultant attains a predetermined value, and means operable whenever said valve means is rendered conductive for producing by said marking means a mark upon said record sheet which by its position thereon is indicative of an instantaneous magnitude of said unknown voltage.

6. In a high speed exhibiting apparatus for recording rapidly varying electrical potentials on a longitudinally moving record sheet, marking means, means for cyclically moving said marking means transversely across said record sheet, an electrical network including a coil, means including at least one magnetic element movable in timed relation with movement of said marking means for rapidly varying a magnetic field cutting said coil to generate voltage impulses in said network each of which varies substantially linearly with time, electric valve means having in said network an input-control circuit, said network including means responsive to a condition for producing in said input-control circuit an electrical potential whose magnitude is representative of an instantaneous magnitude of said condition, the resultant of said potential and one of said impulses in said control circuit rendering said valve means conductive whenever said resultant attains a predetermined value, a capacitor, a discharge circuit for said capacitor including said valve means and said marking means for producing by current flow through said discharge circuit and said record sheet a mark which by its position on said record sheet is indicative of an instantaneous magnitude of said unknown potential, a charging circuit for said capacitor including electric valve means which is non-conductive during discharge of said capacitor, and means operable in timed relation with said marking means for rendering said last-named means conductive during a time interval when said first-named valve means is non-conductive.

7. In a high speed exhibiting apparatus for recording rapidly varying electrical potentials on a longitudinally moving record sheet, marking means, means for cyclically moving said marking means transversely across said record sheet, means for producing a series of voltage pulses, the magnitude of each of which varies substantially linearly with respect to time, electrical valve means having a control circuit in which an unknown electrical potential is algebraically added to said linear pulses, the resultant of said electrical potential and one of said voltage pulses rendering said valve means conductive whenever said resultant attains a predetermined value, said valve having an output circuit, a capacitor connected in series-circuit relation in said output circuit and said output circuit including an electrical connection to said marking means for flow of discharge current from said marking means through said record sheet for producing a mark thereon which by its position is indicative of the instantaneous magnitude of said unknown potential, a second valve means, means including a source of potential for connecting said second valve means in parallel with said first-named valve means for flow of charging current to said capacitor in a direction opposite to flow of current from said capacitor upon discharge thereof through said first-named valve means, and means operable in timed relation with said marking means for rendering said second valve means conductive during time intervals when said first-named valve means is non-conductive.

8. In a high speed exhibiting apparatus for recording rapidly varying electrical potentials on a longitudinally moving record sheet, marking means, means for cyclically moving said marking means transversely across said record sheet, a thyratron having a grid-cathode circuit including a stationary coil, movable magnetic structure driven in timed relation with movement of said marking means in field-varying relation with said coil to generate voltage impulses in said grid-cathode circuit for periodically rendering said thyratron conductive, said thyratron having an anode-cathode circuit including a capacitor and a resistor, a voltage impulse producing circuit including said capacitor, a source of power, a transformer, and a second resistor having a resistance materially greater than said first-named resistor for producing substantially linear voltage impulses in timed relation with the time intervals during which said thyratron is rendered conductive, said capacitor discharging through said thyratron and said resistor of lower resistance while said thyratron is conductive and said source of power being effective to charge said capacitor when said thyratron is non-conductive, a second thyratron having an input circuit connected to the secondary winding of said transformer, said input circuit including means responsive to a condition for producing in said input circuit an electrical potential whose magnitude is representative of an instantaneous magnitude of said condition, the resultant of said potential and one of said linearly varying impulses in said control circuit rendering said second thyratron conductive whenever said resultant attains a predetermined value, a second capacitor, a charging circuit for said second capacitor, a third thyratron and a source of supply connected in series in said charging circuit for flow of charging current through said discharge circuit in one direction whenever said third thyratron is rendered conductive, a second transformer having its primary winding connected in series in said discharge circuit for flow therethrough of charging current in one direction and of discharge current in the opposite direction, a unidirectionally conducting device connected across the secondary winding of said second thransformer poled in a direction for flow of current therethrough during the charging of said second capacitor, and electrical connections between said marking means and said secondary winding of said second transformer for flow of current to said record sheet upon discharge of said second capacitor for producing a mark upon the record sheet indicative by its position thereon of an instantaneous magnitude of said unknown potential.

9. In a high speed exhibiting apparatus for recording rapidly varying electrical potentials on a longitudinally moving record sheet, marking means, means for cyclically moving said marking means transversely across said record sheet, a thyratron having a grid-cathode circuit including a stationary coil, movable magnetic structure driven in timed relation with movement of said marking means in field-varying relation with said coil to generate voltage impulses in said grid-cathode circuit for periodically rendering said thyratron conductive, said thyratron having an anode-cathode circuit including a capacitor and a resistor, a voltage impulse producing circuit including said capacitor, a source of power, a transformer, and a second resistor having a resistance materially greater than said first-named resistor for producing substantially linear voltage impulses in timed relation with the time intervals during which said thyratron is rendered conductive, said capacitor discharging through said thyratron and said resistor of lower resistance while said thyratron is conductive and during the time interval which is relatively short compared with the time interval during which said source of power is effective to charge said capacitor through said second resistor, a second thyratron having an input circuit connected to the secondary winding of said transformer, said input circuit including means responsive to a condition for producing in said input circuit an electrical potential whose magnitude is representative of an instantaneous magnitude of said condition, the resultant of said potential and one of said linearly varying impulses in said control circuit rendering said second thyratron conductive whenever said resultant attains a predetermined value, a second capacitor, a charging circuit for said second capacitor, a third thyratron and a source of supply connected in series in said charging circuit for flow of charging current through said discharge circuit in one direction whenever said third thyratron is rendered conductive, a second transformer having its primary winding connected in series in said discharge circuit for flow therethrough of charging current in one direction and of discharge current in the opposite direction, a unidirectionally conducting device connected across the secondary winding of said second transformer poled in a direction for flow of current therethrough during the charging of said second capacitor, and electrical connections between said marking means and said secondary winding of said second transformer for flow of current to said record sheet upon discharge of said second capacitor for producing a mark upon the record sheet indicative by its position thereon of an instantaneous magnitude of said unknown potential.

10. In a high speed exhibiting apparatus for recording rapidly varying electrical potentials on a longitudinally moving record sheet, marking means comprising a plurality of conductive elements, means for cyclically moving said elements in succession transversely across said record sheet, a thyratron having a grid-cathode circuit including a stationary coil, movable magnetic structure driven in timed relation with movement of said marking means in field-varying relation with said coil to generate a voltage impulse in said grid-cathode circuit for rendering said thyratron conductive for each movement of a marking element across said record sheet, said thyratron having an anode-cathode circuit including a capacitor and a resistor, a voltage impulse producing circuit including said capacitor, a source of power, a transformer, and a second resistor having a resistance materially greater than said first-named resistor for producing substantially linear voltage impulses in timed relation with the time intervals during which said thyratron is rendered conductive, said capacitor discharging through said thyratron and said resistor of lower resistance while said thyratron is conductive and during the time interval which is relatively short compared with the time interval during which said source of power is effective to charge said capacitor through said second resistor, a second thyratron having an input circuit connected to the secondary winding of said transformer, said input circuit including means responsive to a condition for producing in said input circuit an electrical potential whose magnitude is representative of an instantaneous magnitude of said condition, the resultant of said potential and one of said linearly varying impulses in said control circuit rendering said second thyratron conductive whenever said resultant attains a predetermined value, a second capacitor, a charging circuit for said second capacitor, a third thyratron and a source of supply connected in series in said charging circuit for flow of charging current through said discharge circuit in one direction whenever said third thyratron is rendered conductive, a second transformer having its primary winding connected in series in said discharge circuit for flow therethrough of charging current in one direction and of discharge current in the opposite direction, a unidirectionally conducting device connected across the secondary winding of said second transformer poled in a direction for flow of current therethrough during the charging of said second capacitor, and electrical connections between said marking means and said secondary winding of said second transformer for flow of current to said record sheet upon discharge of said second capacitor for producing a mark upon the record sheet indicative by its position thereon of an instantaneous magnitude of said unknown potential.

ELIZABETH K. BEHR,
*Administratrix of the Last Will and Testament of Leo Behr, Deceased.*

REFERENCES CITED

The following references are of record in the file of this patent:

UNITED STATES PATENTS

| Number | Name | Date |
|---|---|---|
| 2,143,376 | Hansell | Jan. 10, 1939 |
| 2,321,605 | Keinath | June 15, 1943 |
| 2,401,019 | Rieber | May 28, 1946 |
| 2,434,531 | Wilson | Jan. 13, 1948 |

FOREIGN PATENTS

| Number | Country | Date |
|---|---|---|
| 241,505 | Great Britain | Mar. 31, 1926 |

OTHER REFERENCES

Ser. No. 416,911, Jacobi (A. P. C.), published May 25, 1943.